US012798935B2

(12) United States Patent
Aurich et al.

(10) Patent No.: US 12,798,935 B2
(45) Date of Patent: Nov. 17, 2026

(54) HYDRAULIC LIFTING COLUMN AND MEDICAL DEVICE

(71) Applicant: HAWE Hydraulik SE, Aschheim (DE)

(72) Inventors: Danny Aurich, Aschheim (DE); Sven Mueller, Aschheim (DE); Martin Resch, Aschheim (DE)

(73) Assignee: HAWE Hydraulik SE, Aschheim (DE)

( * ) Notice: Subject to any disclaimer, the term of this patent is extended or adjusted under 35 U.S.C. 154(b) by 301 days.

(21) Appl. No.: 18/625,683

(22) Filed: Apr. 3, 2024

(65) Prior Publication Data

US 2024/0351834 A1 Oct. 24, 2024

(30) Foreign Application Priority Data

Apr. 20, 2023 (DE) ..................... 10 2023 203 647.9

(51) Int. Cl.
*B66F 3/32* (2006.01)
*B66F 3/28* (2006.01)

(52) U.S. Cl.
CPC . *B66F 3/32* (2013.01); *B66F 3/28* (2013.01)

(58) Field of Classification Search
CPC ...... B66F 3/10; B66F 3/24; B66F 3/28; B66F 3/30; F15B 15/16
See application file for complete search history.

(56) References Cited

U.S. PATENT DOCUMENTS 6,886,200 B2 * 5/2005 Blyshak ................ F15B 15/149 92/66

FOREIGN PATENT DOCUMENTS

JP 2005500083 A 1/2005
JP 2021126924 A 9/2021

OTHER PUBLICATIONS

German Examination Report for German Application No. 10 2023 203 647.9, dated Jan. 15, 2024, 32 pages.

* cited by examiner

*Primary Examiner* — Tyrone V Hall, Jr.
(74) *Attorney, Agent, or Firm* — Dinsmore & Shohl LLP

(57) ABSTRACT

A hydraulic lifting column for medical devices includes a hydraulic cylinder unit, a base element, a carrier element, at least one intermediate element and at least one first engaging member arranged on the carrier element and formed separately from the carrier element. The hydraulic cylinder unit is configured to move the lifting column along a travel axis between a retracted position and an extended position. The at least one intermediate element is disposed between the base element and the carrier element at least in the retracted position. The carrier element and the at least one intermediate element can be moved relative to the base element along the travel axis by the hydraulic cylinder unit acting on the carrier element. The first engaging member abuts against the intermediate element when the lifting column is moved between the retracted position and the extended position and drives the at least one intermediate element.

11 Claims, 6 Drawing Sheets

B-B

HYDRAULIC LIFTING COLUMN AND MEDICAL DEVICE

CROSS REFERENCE TO RELATED APPLICATION

This application claims priority from German Patent Application No. 10 2023 203 647.9, filed on Apr. 20, 2023, the entire content of which is incorporated herein by reference in their entirety.

FIELD OF THE INVENTION

The present invention relates to a hydraulic lifting column. Furthermore, the invention relates to a medical device comprising such a lifting column.

BACKGROUND OF THE INVENTION

Such lifting columns are used in particular in the medical sector, for example for operating tables, surgical robots or other medical devices. The aim is to adjust the height of a medical element fixed to the lifting column, for example the lying surface of an operating table, as gently as possible relative to the floor.

The demands placed on these hydraulic lifting columns have continued to increase in recent times, not least due to the rapid progress made in the further development and improvement of a wide variety of surgical methods, as well as due to specifications regarding the space requirements and comfort of hydraulic systems. Such lifting columns are configured in particular in telescopic design with several stages. Engaging members provided between the stages ensure that the respective stage is moved along when the lifting column is moved.

Moving the lifting column may be necessary, for example, if a patient needs to be repositioned during an operation, for example by changing the height of the operating table. When moving the lifting column or the operating table between the individual stage transitions, there may be noticeable jerking and audible impacts when the respective stage is moved. Such a stage transition impact occurs in particular when an engaging member of one stage abuts an engaging member of another stage and the engaging member begins to drive the other stage. The impact is caused by the suddenly greater static friction compared to the sliding friction, which must be overcome by moving the stage to be carried along. In order to dampen such stage transition impacts, damping engaging members are preferably used.

Hydraulic lifting columns with corresponding engaging members are known from the state of the art. These use complex metal sliding elements between the stages to reduce the impact. These must be greased and the gap between the sliding elements must be precisely adjusted. However, very complex and expensive spring damper systems are also used as engaging members for damping, which are also maintenance-intensive, for example torsion spring systems.

Consequently, it is the object of the present invention to provide an improved hydraulic lifting column with which the stage transition impacts can be damped simply and cost-effectively when the lifting column is moved.

The problem is solved with a hydraulic lifting column according to the embodiments of the present invention as disclosed herein.

SUMMARY OF THE INVENTION

The hydraulic lifting column according to the invention comprises a hydraulic cylinder unit, a base element, a carrier element and at least one intermediate element. The hydraulic cylinder unit is configured to move the lifting column along a travel axis between a retracted position and an extended position. At least in the retracted position, the at least one intermediate element is disposed between the base element and the carrier element. The carrier element and the at least one intermediate element can be moved relative to the base element along the travel axis in that the hydraulic cylinder unit acts on the carrier element. The lifting column further comprises at least one first engaging member arranged on the carrier element and formed separately from the carrier element, wherein the first engaging member abuts the intermediate element when the lifting column is moved between the retracted position and the extended position and drives the at least one intermediate element. The first engaging member has a damping element, the damping element being preferably made of plastic. Preferably, the engaging member is a one-piece engaging member, i.e., an engaging member that consists of only a single part. In other words, the engaging member and the dampening element may be provided as a one-piece unitary member.

In this way, the engaging member can drive the intermediate element when the carrier element is moved, so that the intermediate element is extended when the engaging member of the carrier element abuts the intermediate element during extension. The damping element of the engaging member absorbs an impact when it abuts. The impact is also referred to below as a "stage transition impact". The damping element being made of plastic results in a simple and cost-effective engaging member in just one component.

The base element is preferably fixed to the floor, for example screwed in place. Of course, it is also conceivable that the base element is mounted on a chassis. Preferably, such a chassis can be fixed relative to the floor so that further movement of the chassis relative to the floor can be prevented.

In addition, the hydraulic lifting column can comprise at least one second engaging member arranged on the intermediate element and formed separately from the intermediate element, wherein the first engaging member is configured to abut the second engaging member, which is considered to be a part of the intermediate element when being arranged thereon. This allows the intermediate element to be driven by moving the carrier element along the travel axis. Further engaging members can also be provided, for example on the base element or on other intermediate elements. The second engaging member can, for example, have a damping element, wherein the damping element can also be made of plastic. The second engaging member can also have the same features as the first engaging member.

Preferably, the damping element is made of a first plastic material and a second plastic material, with the first plastic material having a higher elasticity than the second plastic material. Preferably, the damping element has a higher elasticity transverse to the travel axis than parallel to the travel axis. The stiffness, on the other hand, is higher transverse to the travel axis than parallel to the travel axis. This is achieved by using two different plastics with different properties in one component. As a result, different stiffnesses, elasticities and damping are achieved in the direction of the travel axis than transverse to the travel axis.

Preferably, the damping element is formed as a one-piece member. Preferably, the damping element is an injection-molded damping element. The one-piece configuration of the damping element means that it can be produced cost-effectively and without additional components. This also makes it possible to reduce the number of assembly steps and the duration of assembly. The damping element can also be produced using a two-component injection molding process, so that the damping element can be made from the two different plastic materials as described above.

Preferably, the damping element is configured to be elastic in the direction of the travel axis and configured to be rigid transverse to the travel axis. In other words, the damping element is preferably more elastic in the direction of the travel axis than transversely to the travel axis. When the engaging member of the lifting column abuts another engaging member, the damping element allows elastic deformation in the direction of the travel axis, while deformation or crushing transverse to the travel axis is largely reduced or prevented. This can, for example, prevent the engaging member from unintentionally loosening or falling out while at the same time damping the stage transition impacts.

In addition, the first engaging member may have a first and second end transverse to the travel axis and a bar that connects the first and second ends. This allows a geometric directional dependency to be implemented in just one component. This leads to a higher rigidity of the engaging member transverse to the travel axis and a higher elasticity in the direction of the travel axis and thus also to its firm hold in the respective elements of the lifting column.

Preferably, the damping element has an elastic portion formed from the first plastic material. The bar is formed from the second plastic material and the bar divides the elastic portion into an upper and lower elastic portion in the direction of the travel axis. This ensures the stability of the damping element transverse to the travel axis. The upper and lower elastic portions ensure better impact absorption.

Preferably, an upper flexible arm portion is formed at each of the first and second ends in the direction of the travel axis embracing the upper elastic portion in so that it is disposed between the bar and the upper arm portions. The arm portions prevent the elastic elements from bending sideways.

Preferably, a lower flexible arm portion is formed at each of the first and second ends in the direction of the travel axis embracing the lower elastic portion so that it is disposed between the bar and the lower arm portions. The number of arm portions is not limited. For example, only one flexible arm portion can be formed, which connects the first end to the second end.

Preferably, the first engaging member has a first plane of symmetry that is parallel to the direction of the travel axis, and preferably a second plane of symmetry that is perpendicular to the direction of the travel axis. The symmetrical shape of the engaging member enables simple and quick installation of the engaging member and equal damping during extension and retraction of the lifting column. This means that only limited attention needs to be paid to a specific orientation during installation, for example.

Preferably, a sliding lining is attached to the carrier element and to the at least one intermediate element. Preferably, a sliding lining can also be attached to the base element. The sliding linings can be used to reduce the static and sliding friction between the carrier element, the at least one intermediate element and the base element, so that the force required during a stage transition is reduced. This can reduce the impact during the extension of the lifting column and the audible noises. It is possible that individual areas of the elements are provided with sliding surfaces, for example to save costs. However, it is also possible for most of the elements to be fitted with sliding linings in order to reduce friction to a minimum.

The invention also relates to a medical device with a lifting column as described above.

DETAILED DESCRIPTION OF THE INVENTION

An exemplary embodiment of the present invention will now be described with reference to the accompanying figures, wherein identical reference signs denote corresponding or identical elements in the various figures.

Figure 1:
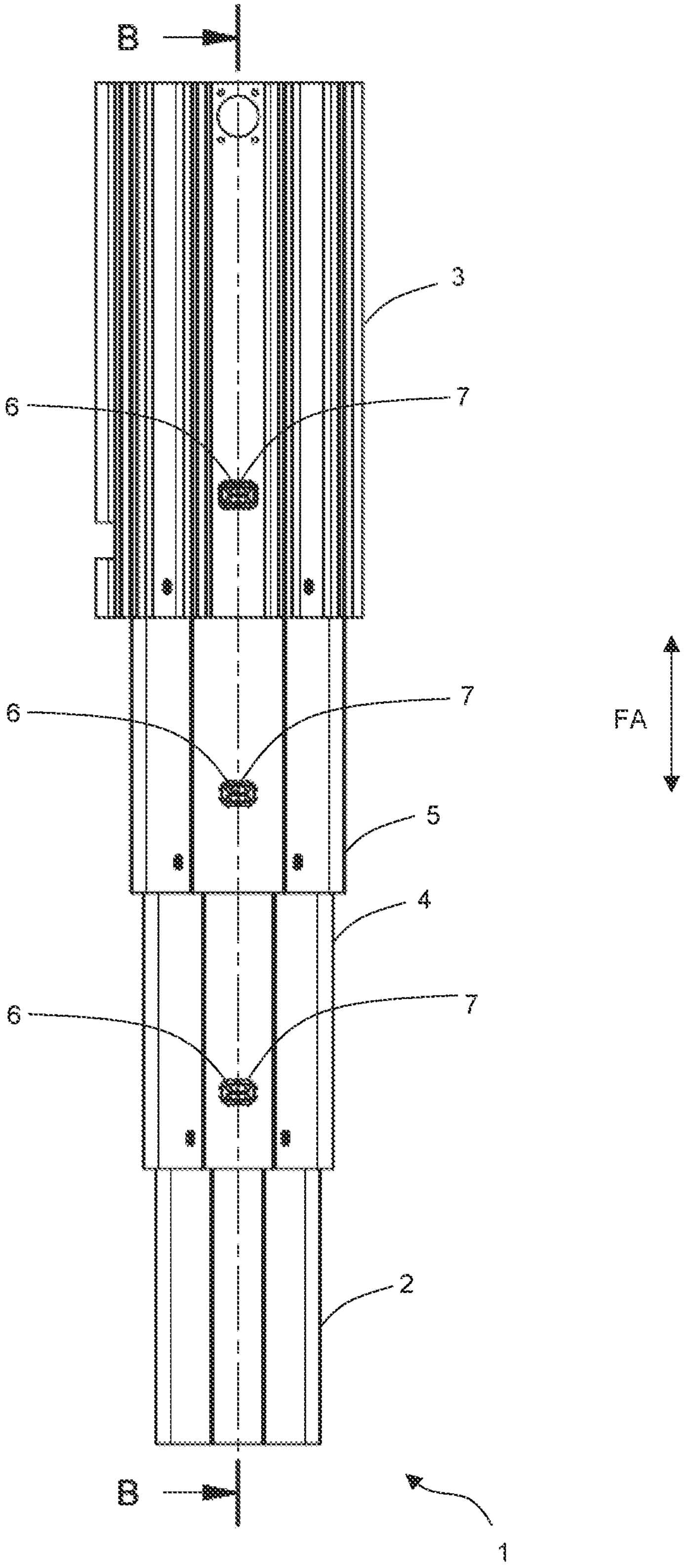
FIG. 1 is a fully extended lifting column.

FIG. 1 shows a lifting column 1 in a fully extended state. The lifting column 1 is of telescopic design and comprises a base element 2, a carrier element 3, a first intermediate element 4 and a second intermediate element 5. The first and second intermediate elements 4 and 5 are at least partially disposed between the base element 2 and the carrier element 3. The second intermediate element 5 is at least partially disposed within the carrier element 3. The first intermediate element 4 is at least partially disposed within the second intermediate element 5 and the base element 2 is at least partially disposed within the first intermediate element 4. The base element 2 can, for example, fix the lifting column 1 to the floor or to a movable chassis (not shown) via a base plate (not shown). In particular, medical devices (not shown), such as operating tables, surgical robots or the like, can be attached to the carrier element 3. Of course, the lifting column 1 can also have only the first intermediate element 4 or more than two intermediate elements.

Figure 4:
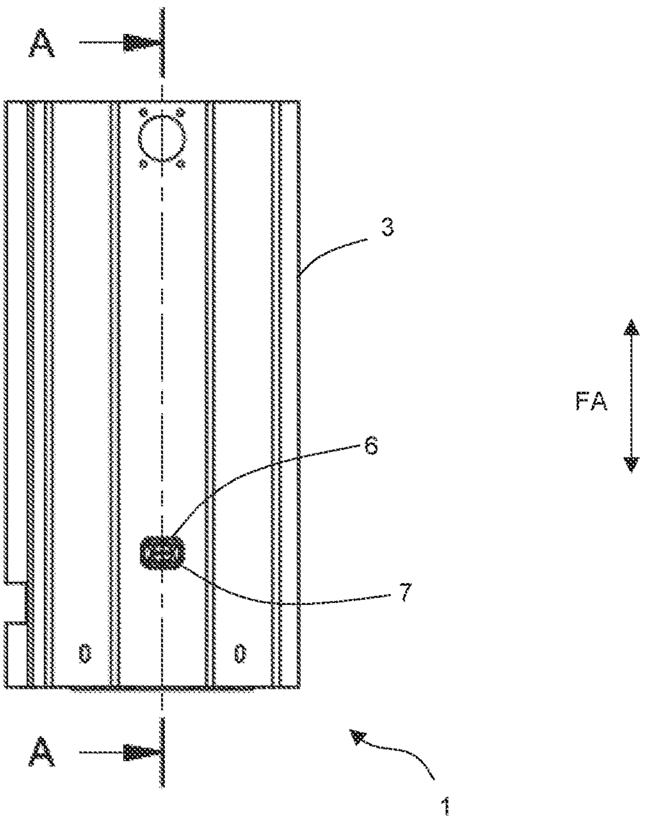
FIG. 4 is a fully retracted lifting column.

The lifting column 1 also has a hydraulic cylinder unit (not shown), which is configured to move the lifting column 1 along a travel axis FA between a retracted position and an extended position. The retracted position describes the position of the lifting column 1 in the fully retracted state, as shown in FIG. 4. The extension position describes the position of the lifting column 1 in the fully extended state, as shown in FIG. 1.

Figure 2:
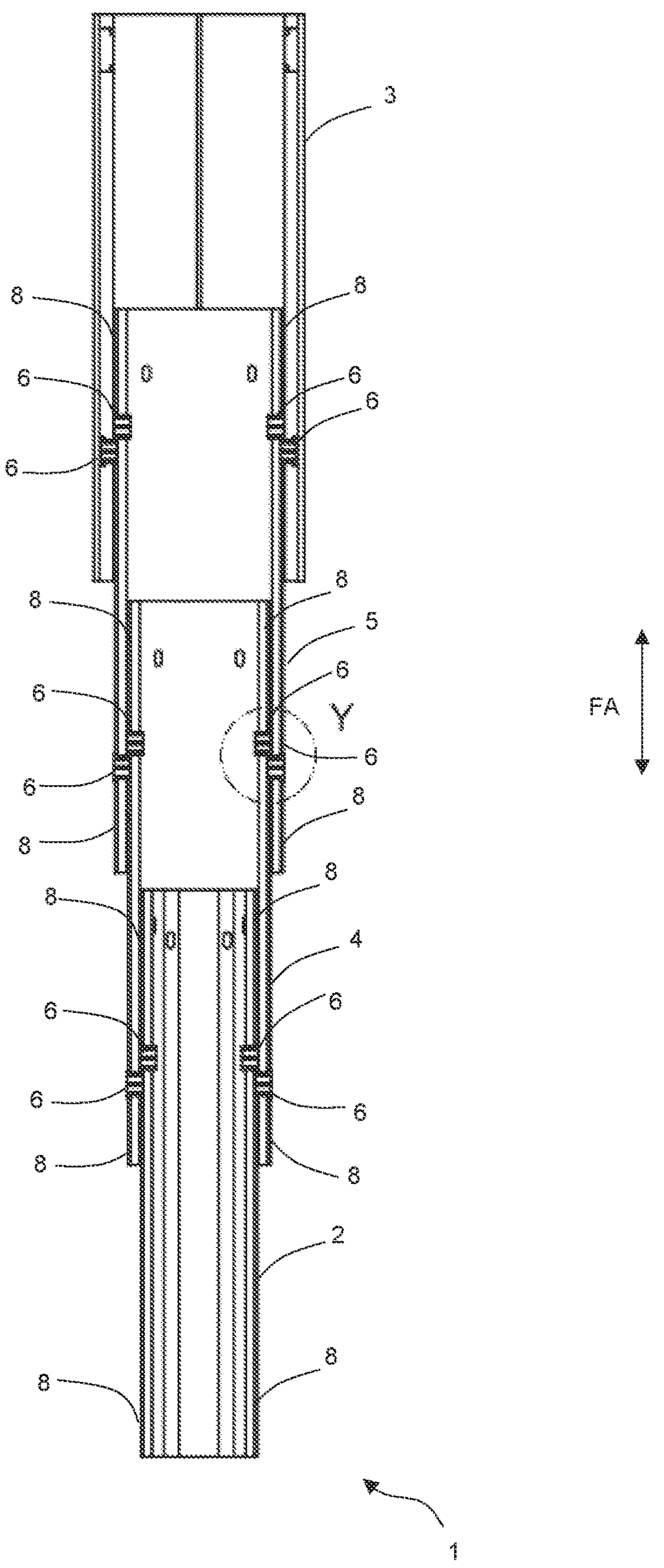
FIG. 2 is a cross-sectional view of the fully extended lifting column of FIG. 1 along line B-B.

FIG. 2 shows a cross-sectional view of the fully extended lifting column 1 of FIG. 1 along line B-B. The lifting column 1 comprises several engaging members 6, which will be described in detail below. Two of the engaging members 6 are arranged on the base element 2, wherein the two engaging members 6 are arranged in the upper half of the base element 2 in direction of the travel axis FA. Two further engaging members 6 are arranged on the carrier element 3 in the lower half of the carrier element 3 in direction of the travel axis FA. The engaging members 6 arranged on the carrier element 3 can also be referred to as first engaging members within the meaning of the invention. On the first intermediate element 4, two of the engaging members 6 are arranged in the lower half of the first intermediate element 4 in direction of the travel axis FA and two of the engaging members 6 are arranged in the upper half of the first intermediate element 4 in the direction of the travel axis FA. The second intermediate element 5 has the same number and arrangement of engaging members 6 as the first intermediate element 4. The engaging members 6 arranged on the intermediate elements 4, 5 can also be referred to as second engaging members within the meaning of the invention. The engaging members 6 are formed separately from the base element 2, the first and second intermediate elements 4, 5 and the carrier element 6. The engaging members 6, which are arranged in the upper half of the elements, are hereinafter referred to as "upper engaging members". The engaging members 6, which are arranged in the lower half of the elements, are hereinafter referred to as "lower engaging members".

Passage openings 7 are provided on the base element 2, the first and second intermediate elements 4, 5 and the carrier element 3, in which the engaging members 6 are arranged in such a way that the engaging members 6 protrude inwards and outwards of the respective element. A passage opening 7 is provided for each engaging member 6.

The hydraulic cylinder unit is operatively connected to the base element 2 and engages with the carrier element 3. If pressure is applied to the hydraulic cylinder unit in the conventional manner, the lifting column 1 extends. The lifting column 1 can be retracted by gravity or (additionally) by applying the appropriate pressure.

Starting from the fully retracted lifting column 1, as shown in FIG. 4, the hydraulic cylinder unit first moves the carrier element 3 axially upwards along the travel axis FA, as the hydraulic cylinder unit engages with the carrier element 3. If the carrier element 3 is extended so far that the engaging members 6 of the carrier element 3 reach the upper engaging members 6 of the second intermediate element 5, the engaging members 6 of the carrier element 3 abut the upper engaging members 6 of the second intermediate element 5. As a result, the second intermediate element 5 is driven and, like the carrier element 3, is moved in the direction of the travel axis FA. If the lifting column 1 is extended further, the lower engaging members 6 of the second intermediate element 5 abut the upper engaging members 6 of the first intermediate element 4, as shown in the detailed view in FIG. 3. As a result, the first intermediate element 4 is driven and, like the carrier element 3 and the second intermediate element 5, is moved in the direction of the travel axis FA. The lifting column 1 can still be extended until the lower engaging members 6 of the first intermediate element 4 abut against the engaging members 6 of the base element 2. This position of the lifting column 1 is also referred to as the extended position, as shown in FIG. 2.

It is no longer possible to extend the lifting column 1 any further, as all engaging members 6 of the respective outer elements are attached to the corresponding engaging members 6 of the respective inner elements. The order of the elements to be moved can be arbitrary, for example the first intermediate element 4 can be moved first, then the second intermediate element 5 and finally the carrier element 3.

Figure 5:
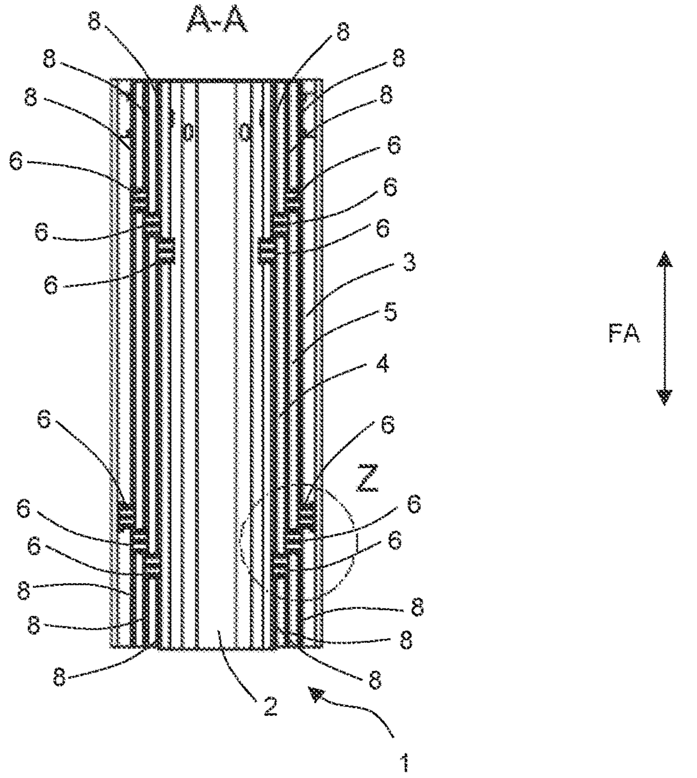
FIG. 5 is a cross-sectional view of the fully retracted lifting column of FIG. 4 along line A-A.

The retraction of the lifting column 1 works in the opposite way to the extension of the lifting column 1, as described above. FIG. 5 shows a cross-sectional view of the fully retracted lifting column from FIG. 4 along line A-A. The lifting column 1 is retracted until the engaging members 6 of the outer elements abut the engaging members 6 of the inner elements in the opposite direction.

Figure 3:
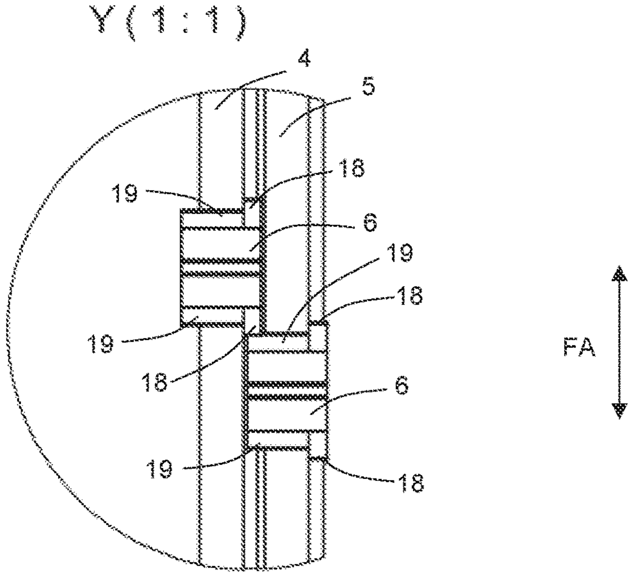
FIG. 3 is a detail view of area Y of the engaging members in the extended lifting column of FIG. 2.
Figure 6:
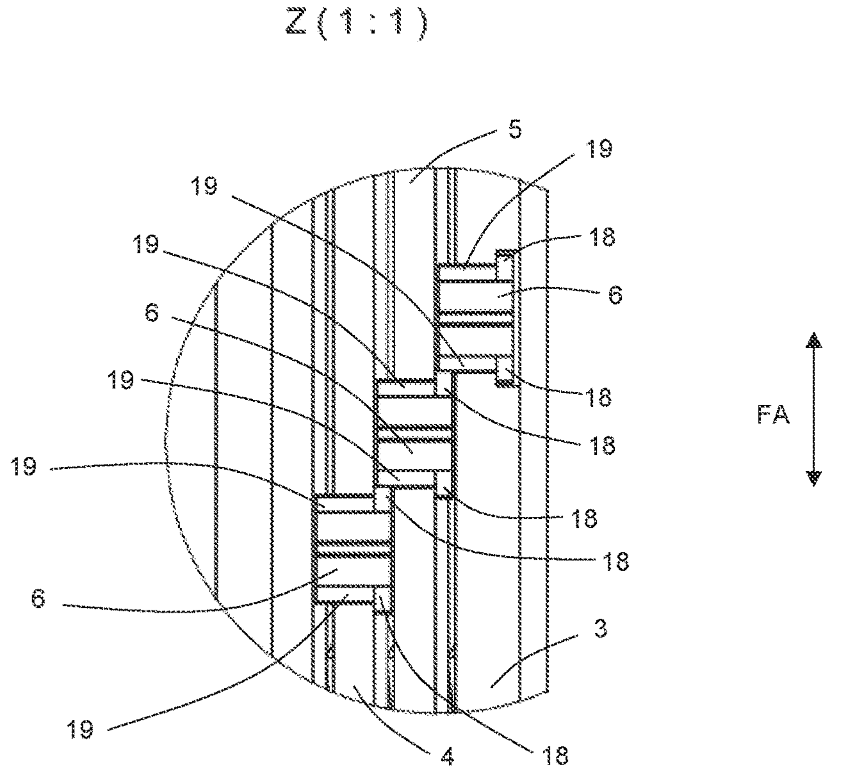
FIG. 6 is a Detail view of area Z of the engaging members in the retracted lifting column of FIG. 5.

FIG. 6 shows a detailed view of the area Z of the engaging members 6 in the retracted lifting column 1 from FIG. 5. It can be seen that in the retracted position, the engaging members 6 of the respective outer elements abut the engaging members 6 of the respective inner elements from above. In the extended position, on the other hand, the engaging members 6 of the respective outer elements abut the engaging members 6 of the respective inner elements 6 from below, as shown in FIG. 3.

Furthermore, sliding linings 8 are attached to the first and second intermediate elements 4, 5 and the carrier element 6. The sliding linings can be attached to an inner side and/or an outer side of the first and second intermediate elements 4, 5 and to an inner side of the carrier element 6. Further sliding linings 8 can also be attached to an outer side of the base element 2. The sliding linings 8 reduce friction between the individual elements when the lifting column 1 is moved. Preferably, lubricant- and grease-free sliding linings 8 are used for medical devices.

The engaging member 6 is now described below with reference to FIGS. 7 to 9. In this exemplary embodiment, all engaging members 6 are identically configured. However, it is of course also possible that the engaging members 6 are configured differently. For example, the engaging members 6 of the carrier element 3 bear the greatest weight when the lifting column 1 is fully extended, so that it may make sense to reinforce these engaging members 6 under certain circumstances.

Figure 7:
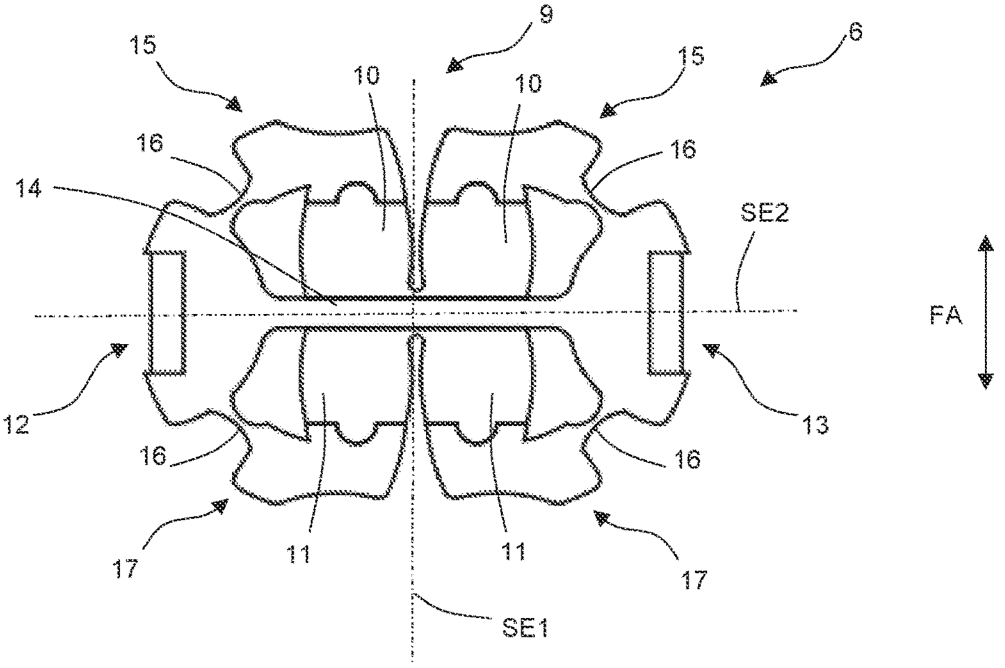
FIG. 7 is a top view of the engaging member.

FIG. 7 shows a top view of the engaging member 6. The engaging member 6 has a damping element 9, which dampens an impact when the engaging member 6 abuts. In particular, the damping element 9 is made of plastic. Preferably, the damping element 9 is made of a first and a second plastic material. The first plastic material has a higher elasticity than the second plastic material. The second plastic material, on the other hand, is more rigid than the first plastic material.

Preferably, the damping element 9 is a one-piece damping element, i.e., a damping element that only consists of a single part. The damping element 9 is manufactured using an injection molding process, for example. The damping element 9 can also be manufactured from the first and second plastic material in a two-component injection molding process.

The damping element 9 has an upper elastic portion 10 in the direction of the travel axis FA. The damping element 9 also has a lower elastic portion 11 in the direction of the travel axis FA. Furthermore, the engaging member 6 has a first end 12 and a second end 13 transverse to the travel axis FA. A bar 14 is formed between the first and second ends 12 and 13, which connects the first end 12 to the second end 13. The upper elastic portion 10 and the lower elastic portion 11 are divided by the bar 14. The bar 14 prevents deformation of the engaging member 6 in the direction transverse to the travel axis FA.

The upper and lower elastic portions 10 and 11 are made of the first plastic material with the higher elasticity. The bar 14 and the first and second ends 12 and 13 are made of the second plastic material with the higher rigidity. As a result, the damping element 9 is elastic in the direction of the travel axis FA and rigid transversely to the travel axis FA.

The damping element 9 also has two upper flexible arm portions 15 in the direction of the travel axis FA, one of which is attached to the first end 12 and one to the second end 13. The upper arm portions 15 embrace the upper elastic portion 10, so that the latter is disposed between the bar 14 and the upper arm portions 15. The upper arm portions 15 are molded from the second plastic material. The upper arm portion 15 has a narrowed portion 16, which is connected to the first end 12. Due to the narrowed portion 16, the upper arm portion 15 is configured to be bendable and allows elastic deformation of the upper elastic portion 10.

The damping element 9 also has two lower flexible arm portions 17 in the direction of the travel axis FA, one of which is attached to the first end 12 and one to the second end 13. The lower arm portions 17 embrace the lower elastic portion 11, so that the latter is disposed between the bar 14 and the lower arm portions 17. The lower arm portions 17 are molded from the second plastic material. Like the upper arm portion 15, the lower arm portion 17 comprises the narrowed portion 16, which is connected to the first end 12. Due to the narrowed portion 16, the lower arm portion 17 is configured to be bendable and allows elastic deformation of the lower elastic portion 10.

As shown in FIG. 7, the engaging member 6 has a first plane of symmetry SE1 which is parallel to the direction of the travel axis FA. The first plane of symmetry SE1 runs through the median line of the bar 14, so that the upper elastic portion 10 is symmetrical to the lower elastic portion 11 and the upper arm portions 15 are symmetrical to the lower arm portions 17. Furthermore, the engaging member 6 has a second plane of symmetry SE2, which is perpendicular to the direction of the travel axis FA.

Figure 8:
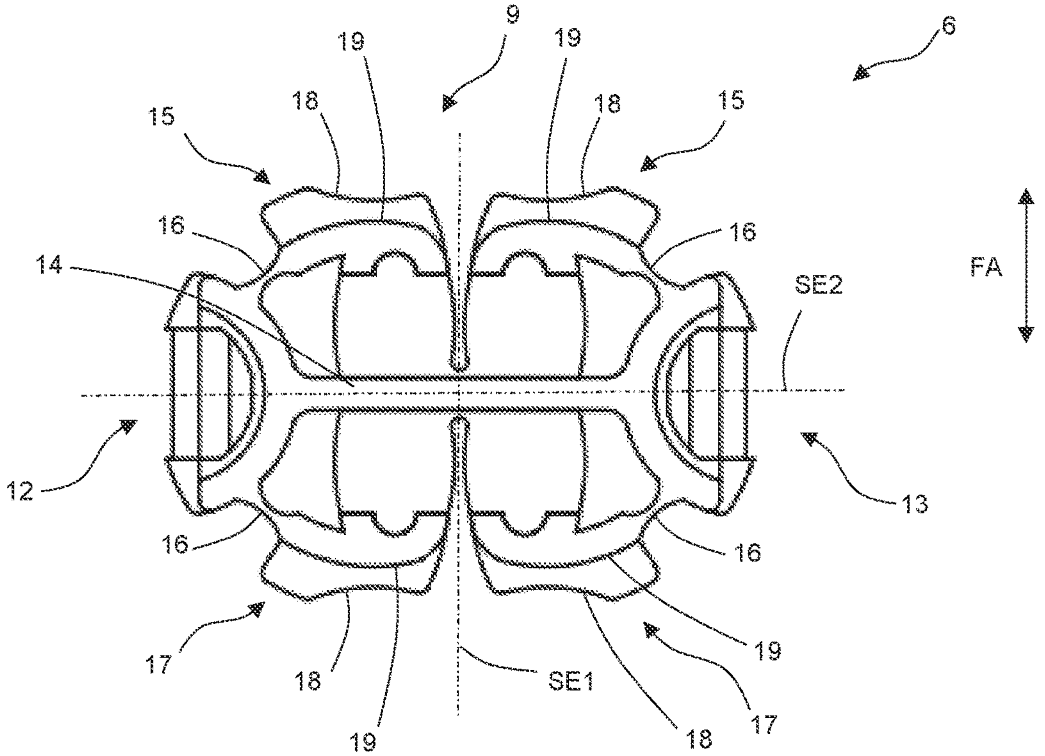
FIG. 8 is a rear view of the engaging member.

FIG. 8 shows a rear view of the engaging member 6. The engaging member 6 has a concave portion 18 and a convex portion 19, which are formed on the upper and lower arm portions 15 and 17. The concave portion 18 protrudes beyond the convex portion 19. The shape of the concave portion 18 corresponds to the shape of the convex portion 19.

As shown in FIGS. 3 and 6, the convex portion 19 of the engaging member 6 protrudes inwards from the respective element and the concave portion 18 protrudes outwards. When the engaging members 6 abut during the movement of the lifting column 1, the convex portion 19 of one engaging member 6 abuts the concave portion 18 of another engaging member 6.

Figure 9:
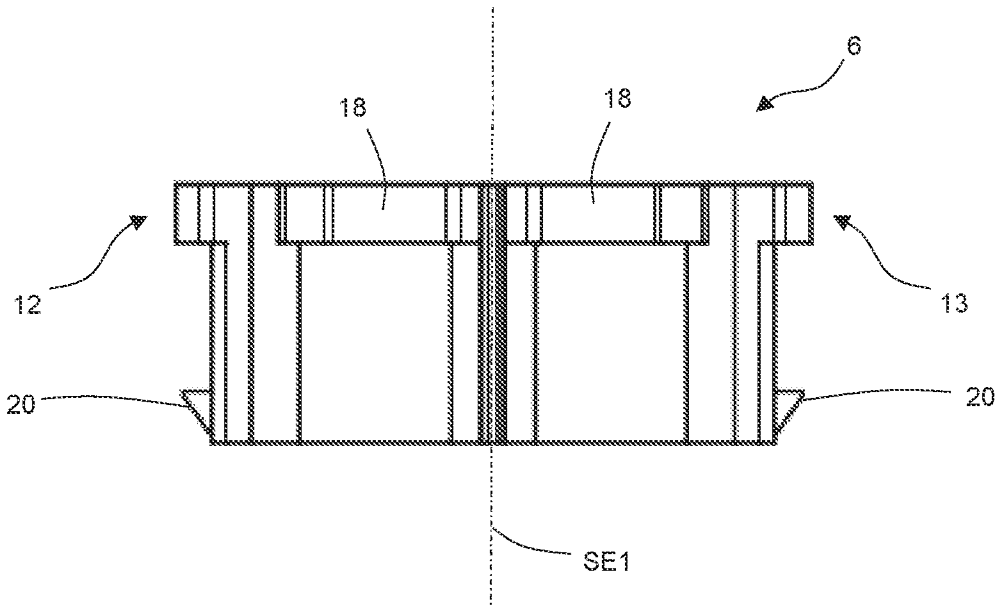
FIG. 9 is a side view of the engaging member.

FIG. 9 shows a side view of the engaging member 6. The engaging member 6 has latching lugs 20, which are formed at the first and second ends 12 and 13 respectively. The latching lugs 20 engage on the inside of the respective element and form a barb. This ensures that the engaging members 6 are securely fixed in the respective passage openings 7. To remove the engaging members 6, they are elastically deformed by moving the latching lugs 20 towards each other, i.e., in the direction of the first plane of symmetry SE1.

LIST OF REFERENCE SIGNS

1 hydraulic lifting column
2 base element
3 carrier element
4 first intermediate element
5 second intermediate element
6 engaging member
7 passage opening
8 sliding lining
9 damping element
10 upper elastic portion
11 lower elastic portion
12 first end
13 second end
14 bar
15 upper flexible arm portion
16 narrowed portion
17 Lower flexible arm portion
18 concave portion
19 convex portion
20 latching lug

The invention claimed is:

1. A hydraulic lifting column, comprising:
a hydraulic cylinder unit;
a base element;
a carrier element;
at least one intermediate element; and
at least one first engaging member arranged on the carrier element and formed separately from the carrier element,
wherein the hydraulic cylinder unit is configured to move the lifting column along a travel axis between a retracted position and an extended position,
wherein the at least one intermediate element is disposed between the base element and the carrier element at least in the retracted position,
wherein the carrier element and the at least one intermediate element is movable relative to the base element along the travel axis in that the hydraulic cylinder unit acts on the carrier element,
wherein the first engaging member abuts the intermediate element when the lifting column is moved between the retracted position and the extended position and drives the at least one intermediate element,
wherein the first engaging member has a damping element formed from a first plastic material and a second plastic material, the first plastic material having a higher elasticity than the second plastic material.

2. The hydraulic lifting column according to claim 1, further comprising at least one second engaging member arranged on the intermediate element and formed separately from the intermediate element, wherein the first engaging member is configured to abut the second engaging member.

3. The hydraulic lifting column according to claim 1, wherein the damping element is formed as one-piece member and is manufactured by injection moulding.

4. The hydraulic lifting column according to claim 1, wherein the damping element is configured to be elastic in the direction of the travel axis and is configured to be rigid transversely to the travel axis.

5. The hydraulic lifting column according to claim 1, wherein the first engaging member has a first end and second end transverse to the travel axis, and further has a bar connecting the first and second ends.

6. The hydraulic lifting column according to claim 5, wherein the damping element has an elastic portion which is formed from the first plastic material, the bar is formed from the second plastic material and the bar divides the elastic portion into an upper and lower elastic portion in the direction of the travel axis.

7. The hydraulic lifting column according to claim 6, wherein an upper flexible arm portion is formed at each of the first and second ends in the direction of the travel axis embracing the upper elastic portion so that the latter is disposed between the bar and the upper arm portions.

8. The hydraulic lifting column according to claim 6, wherein a lower flexible arm portion is formed at each of the first and second ends in the direction of the travel axis embracing the lower elastic portion, so that the latter is disposed between the bar and the lower arm portions.

9. The hydraulic lifting column according to claim 1, wherein the first engaging member has a first plane of symmetry which is parallel to the direction of the travel axis, and preferably has a second plane of symmetry which is perpendicular to the direction of the travel axis.

10. The hydraulic lifting column according to claim 1, wherein a sliding lining is attached to the carrier element and to the at least one intermediate element.

11. A medical device comprising a hydraulic lifting column according to claim 1.

* * * * *